United States Patent [19]

Crivello

[11] 4,192,924
[45] Mar. 11, 1980

[54] METHOD OF FOAMING CURABLE ORGANIC RESIN COMPOSITIONS

[75] Inventor: James V. Crivello, Clifton Park, N.Y.

[73] Assignee: General Electric Company, Schenectady, N.Y.

[21] Appl. No.: 34,372

[22] Filed: Apr. 30, 1979

Related U.S. Application Data

[60] Division of Ser. No. 962,997, Nov. 22, 1978, abandoned, which is a continuation-in-part of Ser. No. 861,127, Dec. 16, 1977.

[51] Int. Cl.$^2$ ............................................. C08J 9/14
[52] U.S. Cl. ..................................... 521/126; 521/93; 521/97; 521/125; 521/130; 521/135; 521/146; 521/149; 521/150; 521/154; 521/178; 521/181; 521/182; 528/92; 528/139; 528/142; 528/144; 528/254; 528/258; 528/259; 528/409; 528/410
[58] Field of Search ................... 521/126, 93, 97, 125, 521/130; 528/92, 139, 142

*Primary Examiner*—Morton Foelak
*Attorney, Agent, or Firm*—William A. Teoli; Joseph T. Cohen

[57] ABSTRACT

Curable organic resin compositions, such as epoxy resins, are provided, based on the use of a diaryliodonium salt-redox catalyst curing system. The curable compositions can provide flexible or rigid organic resin foam when used with a volatile organic solvent as a result of exothermic heat of cure.

3 Claims, No Drawings

METHOD OF FOAMING CURABLE ORGANIC RESIN COMPOSITIONS

CROSS REFERENCE TO RELATED APPLICATIONS

This application is a division of application Ser. No. 962,997, filed Nov. 22, 1978, now abandoned which is a continuation-in-part of my copending application Ser. No. 861,127, filed Dec. 16, 1977 and assigned to the same assignee as the present invention. Additional related applications are copending application Ser. No. 861,128, filed Dec. 16, 1977, Ser. No. 689,247, filed May 24, 1976, now abandoned and copending application Ser. No. 940,564, filed Sept. 8, 1978.

BACKGROUND OF THE INVENTION

The present invention relates to curable organic resin compositions which employ a diaryliodonium-redox catalyst system of copper salt in combination with ascorbic acid, stannous salts or an activated α-hydroxy compound. More particularly, the present invention relates to organic resin foam and method of foaming.

As shown in my copending application Ser. No. 861,128, filed Dec. 16, 1977 and assigned to the same assignee as the present invention, aromatic iodonium salts can be employed in combination with organic acids or copper salts to facilitate the heat cure of various organic materials, such as epoxy resins. I have also found, as shown in my copending application Ser. No. 869,247, filed May 24, 1976, now abandoned, and assigned to the same assignee as the present invention, that valuable results also can be achieved if reducing agents such as thiophenol are used in combination with aryl onium salts to facilitate the thermal cure of epoxy resins. Surprisingly, in the absence of such cocatalysts, the cure of cationically polymerizable organic materials, such as epoxy resins, with an aromatic iodonium salt can require temperatures exceeding 200° C. over a extended period of time. I have now discovered that if a diaryliodonium salt of the formula, $$[(R)_a(R^1)_bI]^+[Y]^- \qquad (I)$$

is employed with a redox catalyst comprising a mixture of copper salt, ascorbic acid or derivatives thereof, an $Sn^{+2}$ salt or an activated α-hydroxy compound with a cationically polymerizable organic material, e.g., an epoxy resin, the cure of the organic material can be achieved without the use of external heat, where R is a monovalent aromatic organic radical, $R^1$ is a divalent aromatic organic radical, Y is a non-nucleophilic anion defined below, a is a whole number equal to 0 to 2, b is a whole number equal to 0 or 1, and when a is 0, b is 1, and when b is 0, a is 2. If an organic solvent is utilized with the cationically polymerizable organic material and the diaryliodonium salt-redox catalyst curing system, exothermic heat of reaction can generate an organic foam.

SUMMARY OF THE INVENTION

There is provided by the present invention, curable compositions comprising
(A) a cationically polymerizable organic resin, and
(B) 1% to 35% by weight of the curable composition of a catalyst consisting essentially of
  (i) a diaryl iodonium salt of formula (1),
  (ii) 0.5 to 10 parts, per part of (i), of a copper salt and
  (iii) 0.5 part to 10 parts, per part of (i) of a member selected from the class consisting of ascorbic acid, an ascorbic acid derivative, a $Sn^{+2}$ compound, an activated α-hydroxy compound, and mixtures thereof.

Anions included by Y of formula (I) are, for example, $MQ_d$, where M is a metal or metalloid, Q is a halogen radical and d is an integer having a value of from about 4-6 inclusive. Besides epoxy resins, formula (I) iodonium salts also have been found to be useful in curing cyclic ethers, lactones, lactams and cyclic acetals, etc., where the iodonium salts also can have non-nucleophilic counterions such as perchlorate, $CF_3SO_3^-$ and $C_6H_4SO_3^-$. Again, the cationically polymerizable material can be a phenol-formaldehyde, urea-formaldehyde or melamineformaldehyde resin, Y of formula (I) also can include in addition to $MQ_d$ and other non-nucleophilic counterions previously recited, halide counterions such as Cl, Br, F and I as well as nitrate, phosphate, etc.

Radicals included by R of formula (I) can be the same or different aromatic carbocyclic or heterocyclic radicals having from 6 to 20 carbon atoms, which can be substituted with from 1 to 4 monovalent radicals selected from $C_{(1-8)}$ alkoxy, phenyl, chlorophenyl, nitrophenyl, methoxyphenyl, pyridyl, etc. Radicals included by $R^1$ are divalent radicals such as

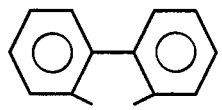 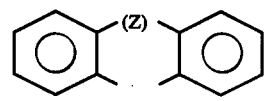

etc., Z can be —O—,

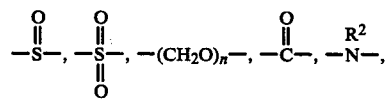

$R^2$ is $C_{(1-8)}$ alkyl or $C_{(6-13)}$ aryl and n is an integer equal to 1-8 inclusive. Metal or metalloids included by M of formula (I) are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., actinides, such as Th, Pa, U, Np, etc., and metalloids such as B, P, As, etc. Complex anions included by $MQ_d^{-(d-e)}$ are, for example, $BF_4^-$, $PF_6^-$, $AsF_6^-$, $SbF_6^-$, $FeCl_4^-$, $SnCl_6^-$, $SbCl_6^-$, $BiCl_5^{-=}$, etc.

Halonium salts included by formula (I) are, for example,

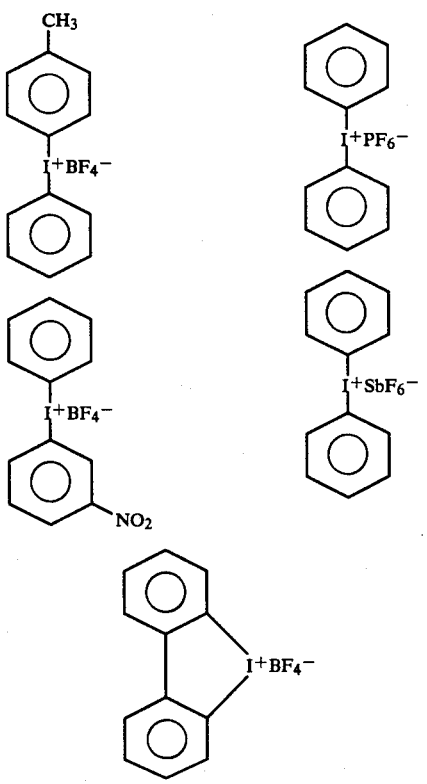

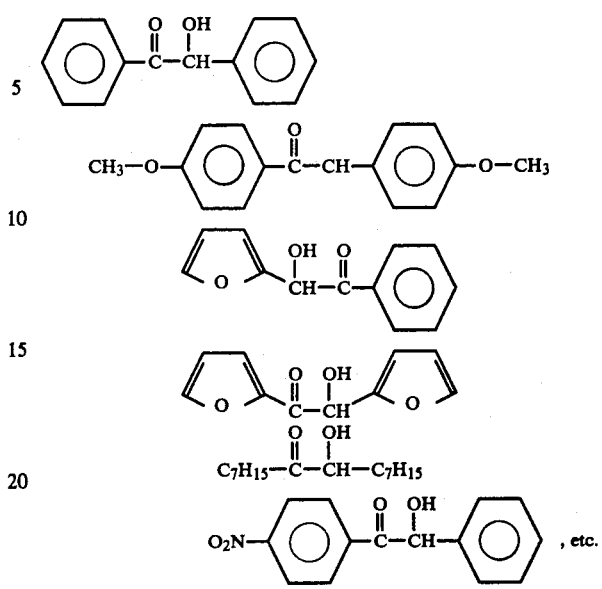

There is also provided by the present invention a foaming method which comprises
(1) agitating a curable composition comprising,
  (C) a cationically polymerizable organic material,
  (D) 1% to 35% by weight of the curable composition of a mixture of
    (iv) a diaryliodonium salt of formula (I),
    (v) 0.5 part to 10 parts, per part of (iv), of a copper salt and
    (vi) 0.5 part to 10 parts, per part of (iv), of a member selected from ascorbic acid, an ascorbic acid derivative, an $Sn^{+2}$ compound salt, an activated α-hydroxy compound and mixtures thereof,
  (E) 1% to 30% by weight of (C), (D) & (E) of a volatile inert organic solvent, and
(2) thereafter allowing the ingredients of the resulting mixture to react resulting in the production of exothermic heat and the simultaneous vaporization of the organic solvent and the cure of the cationically curable organic resin.

Copper I and II salts included by the redox system of the present invention are, for example, carboxylic acid and mineral acid copper salts such as Cu(II) benzoate, Cu(II) citrate, Cu(II) formate, Cu(II) acetate, Cu(II) stearate, Cu(II) oleate, Cu(II) carbonate; Cu(I) gluconate, etc. Ascorbic acid and its derivatives which can be employed in combination with the copper salts include, for example, ascorboyl palmitate, ascorboyl oleate, ascorboyl acetate, etc. Tin ($Sn^{+2}$) compounds which can be used are, for example, $Sn^{+2}$ carboxylic acid salts, e.g., stannous octoate, stannous stearate, stannous laurate, stannous citrate, stannous oxalate, stannous benzoate, etc. Among the α-hydroxy compounds there are included ketones such as acyloins and benzoins,

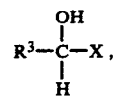

In addition to ascorbic acid and α-hydroxy ketones other activated α-hydroxy compounds which can be used with copper salts as defined above, are included by the following formula, $$R^3-\underset{\underset{H}{|}}{\overset{\overset{OH}{|}}{C}}-X,$$

where $R^3$ is a $C_{(1-20)}$ alkyl radical, or $C_{(6-20)}$ aryl radical and X is a monovalent radical selected from the class of nitro, halo, sulfone, $CO_2R^4$, cyano,

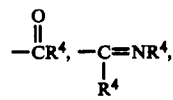

$-CCl_3$ and $CHCl_2$, where $R^4$ is selected from hydrogen and $R^3$.

The diaryliodonium salts of formula (I) and methods for making them are shown in Crivello U.S. Pat. No. 3,981,897, assigned to the same assignee as the present invention. Additional methods for making such diaryliodonium salts are shown by F. M. Beringer, R. A. Falk, M. Karmal, J. Lillien, G. Masullo, M. Mausner, E. Sommers, J. Am. Chem. Soc., 81 342 (1958) and I. Mason, Nature, 139 150 (1937); I. Mason and E. Race, J. Am. Chem. Soc., 1718 (1937).

Included by the cationically polymerizable materials which can be employed in the curable compositions of the present invention are, for example, epoxy resins which include any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phenol-formaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Pleuddemann and G. Fanger, J. Am. Chem. Soc. 81 2632-5 (1959). As described in the literature, epoxy resins can also be modified in a number of standard ways such as reactions with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,850; 3,567,797; 3,677,995, etc. Further examples of epoxy resins which can be used are shown in the Encyclopedia of Polymer Science and Technology, Vol. 6, 1967, Interscience Publishers, New York, pp. 209-271.

Additional examples of the cationically polymerizable materials are, for example, vinyl organic monomers, vinyl organic prepolymers, cyclic organic ethers, cyclic organic esters, cyclic organic sulfides, organo silicon cyclics, etc. There are included, for example, styrene, vinyl acetamide, α-methyl styrene, isobutyl vinylether, n-octyl vinylether, acrolein, 1,1-diphenylethylene, β-pinene, vinyl arenes such as 4-vinyl biphenyl, 1-vinylpyrene, 2-vinyl fluorene, acenaphthalene, 1 and 2-vinyl naphthalene; 9-vinyl carbazole, vinyl pyrrolidone, 3-methyl-1-butene; vinyl cycloaliphatics such as vinylcyclohexane, vinyl cyclopropane, 1-phenylvinylcyclopropane; dienes such as isobutylene, isoprene, butadiene, 1,4-pentadiene, etc.

Some of the vinyl organic prepolymers which can be used to make the polymerizable compositions of the present invention are, for example, $CH_2=CH-O-(CH_2-CH_2O)_m-CH=CH_2$, where m is a positive integer having a value up to about 1000 or higher; multifunctional vinylethers, such as 1,2,3-propane trivinyl ether, trimethylolpropane trivinyl ether, prepolymers having the formula,

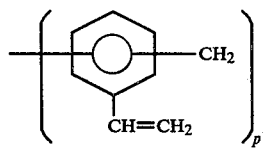

and low molecular weight polybutadiene having a viscosity of from 200 to 10,000 centipoises at 25° C., etc. Products resulting from the cure of such compositions can be used as potting resins, crosslinked coatings, printing inks and other applications typical of thermosetting or network resins.

A further category of the organic materials which can be used to make the polymerizable compositions are cyclic ethers which are convertible to thermoplastics. Included by such cyclic ethers are, for example, oxetanes such as 3,3-bis-chloromethyloxethane, alkoxyoxetanes as shown by Schroeter U.S. Pat. No. 3,673,216, assigned to the same assignee as the present invention;

oxolanes such as tetrahydrofuran, oxepanes, oxygen containing spiro compounds, trioxane, dioxolane, etc.

In addition to cyclic ethers, there are also included cyclic esters such as β-lactones, for example propiolactone, cyclic amines, such as 1,3,3-trimethylazetidine and organosilicone cyclics, for example, materials included by the formula,

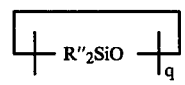

where R″ can be the same or different monovalent organic radicals such as methyl or phenyl and q is an integer equal to 3 to 8 inclusive. An example of an organosilicon cyclic is hexamethyl trisiloxane, octamethyl tetrasiloxane, etc. The products made in accordance with the present invention are high molecular weight oils and gums.

Included by the thermosetting organic condensation resins of formaldehyde which can be used in the practice of the present invention are, for example, urea type resins, such as
$[CH_2=N-CONH_2]_x \cdot H_2O$,
$[CH_2=NCONH_2]_x CH_3COOH$,
$[CH_2=NCONHCH_2NHCONHCH_2OH]_x$;
phenol-formaldehyde type resins, such as

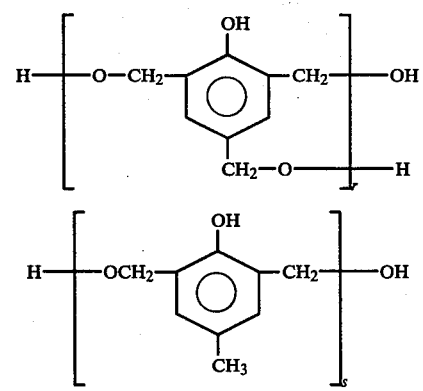

where r and s are integers having a value of 1 or greater;

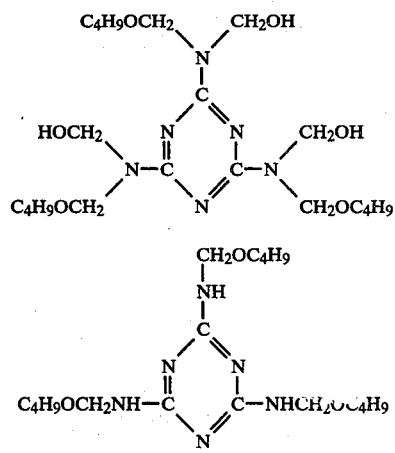

In addition, there can be used melamine thiourea resins, melamine, or urea aldehyde resins, cresol-formaldehyde resins and combinations with other carboxy, hydroxyl, amino and mercapto containing resins, such as polyesters, alkyds and polysulfides.

In particular instances, depending upon the compatability of the halonium salt with the organic material, the halonium salt can be dissolved or dispersed in an organic solvent such as nitromethane, acetonitrile, methylene chloride, etc., prior to its incorporation into the organic material. Experience has shown that the proportion of halonium salt to organic material can vary widely inasmuch as the salt is substantially inert, unless activated. Effective results can be achieved, for example, if a proportion of at least 0.1% by weight of halonium salt is employed, based on the weight of polymerizable composition. Higher or lower amounts can be used, however, depending upon factors such as the nature of organic material, polymerization time desired, etc.

In the practice of the invention, the curable compositions can be made by effecting contact between the diaryliodonium salt, the cationically polymerizable organic resin and the redox system of the copper salt and the ascorbic acid or ascorbic acid derivative. In certain situations, a volatile organic solvent also can be utilized in combination with the aforementioned ingredients to produce a foam, based on the vaporization of the organic solvent due to the generation of exothermic heat of reaction while the cationically polymerizable organic resin is curing.

It has been found that contact between the various ingredients of the curable mixture of the present invention can be effected if the diaryliodonium salt is contacted with the redox catalyst in the presence of the cationically polymerizable organic material. For example, the diaryliodonium salt can be combined with an epoxy resin to produce a stable mixture while the redox catalyst can separately be employed in combination with an epoxy resin which also has infinite shelf stability. In instances where a foam is desired, a volatile organic solvent can be combined with either of the aforementioned stable mixtures or can be introduced separately during the mixing of the respective mixtures. Suitable volatile organic solvents which can be employed to produce rigid or flexible foams in the practice of the present invention are, for example, acetone, hexane, trichlorofluoromethane, n-pentane, 2-methylhexane, dichloromethane, 1,1,2-trichlorotrifluoroethane, methyl alcohol, ethyl alcohol, methyl ethyl ketone, etc. In addition to such volatile solvents, there are also included thermally unstable compounds such as ethylene carbonate, ammonium nitrate, benzoyl peroxide, cyclohexanone peroxide, methyl ethyl ketone peroxide, 2,2'-azobis(2-methylpropionitrile), azobisformamide, etc.

The foamable mixture can be injection molded into suitable receptacles, such as refrigerator doors and the like to provide for the production of insulating foams. Thorough mixing of the ingredients has been found to facilitate the production of a uniform foam which can be achieved by the employment of a mechanical stirrer or agitator, as generally utilized in the art.

In instances where a flexible foam is desired, the above described epoxy resin can be combined with polycaprolactones or any hydroxy terminated polyester to render the foams made in accordance with the present invention more flexible. Typical hydroxy teminated polycaprolactones are Niax polyols, manufactured by the Union Carbide Corporation. There can be utilized from 1 to 60 parts of the hydroxy terminated polyester per part of the epoxy resin and preferably from 1 to 50 parts. included by the hydroxy terminated polyester which can be employed in the practice of the present invention to flexibilize cured epoxy resin films or foams are compounds of the formula,

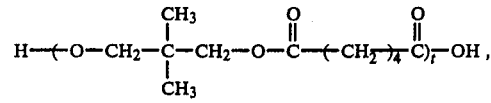

where t is an integer having an average value of from 1 to 100.

As previously indicated, the curable compositions of the present invention also can be used in coating applications and in the production of rigid or flexible films. In addition to the cationically polymerizable organic resin which includes any of the aforementioned epoxy resins, as well as the organic cyclics as previously defined, as well as additives, such as caprolactones for flexibilizing the films and foams made therefrom, there also can be combined with such ingredients fillers in a proportion by weight of from 0 to 500 parts of such filler per 100 parts of the cationically polymerizable organic resin. Suitable fillers include, for example, talc, alumina, sand, silica, ground quartz, wood flour, carbon black, glass fibers, mica, barium sulfate, titanium dioxide, etc.

In addition, the above curable compositions may include additives to enhance surface properties and to control foam cell size. Among such additives are polyalkylene oxide surfactants and silicone fluids.

In order that those skilled in the art will be better able to practice the present invention, the following examples are given by way of illustration and not by way of limitation. All parts are by weight.

EXAMPLE 1

There was added a mixture of copper salt and ascorbic acid in n-butanol to a 3% solution of diphenyliodonium hexafluoroarsenate in 3,4-epoxycyclohexylmethyl-3',4'-epoxycyclohexanecarboxylate. A series of mixtures were made following the procedure using various copper compounds to produce mixtures having an average of from 1–3% by weight of the copper salt and from 0.5 to 3% by weight of ascorbic acid, based on the weight of the mixture. The cure time (sec) was recorded which represented the time for the respective mixtures to harden when examined in 4 dram vials. The following results were obtained where the percent shown in based on the weight percent of the ingredient in the mixture:

| Copper II Compound WT (%) | Ascorbic Acid WT (%) | Cure Time (sec) |
|---|---|---|
| — | — | No Cure |
| — | 3 | No cure |
| Copper benzoate (3) | — | No Cure |
| Copper Benzoate (3) | 3 | 380 |
| Copper benzoate (1) | .05 | 120 |
| Copper benzoate (1) | 1 | >60 |
| Copper stearate (1) | 1 | 60–120 |
| Copper acetate (3) | 3 | 30 |
| Copper formate (3) | 3 | 30 |
| Copper benzoate (1) | 2 | >30 |

The above results show the need for copper salts and the ascorbic acid to achieve a cure of the epoxy resin and the effect on the cure time when the weight percent of the respective ingredient is varied at ambient conditions.

EXAMPLE 2

A study was made with a mixture of an epoxy resin containing 1% by weight of copper benzoate and 3% by weight of ascorbic acid to determine whether cure time would be affected by varying the type of diaryliodonium salt used. The redox catalyst was added as a suspension in ethylene glycol to the epoxy resin of Example 1 which contained 3% by weight of diaryliodonium salt. The following results were obtained:

| Diaryliodonium Salt | Cure Time (sec) |
|---|---|
| $[(\text{C}_6\text{H}_5)-\text{I}^+\text{AsF}_6^-]$ | 75 |
| $[\text{Cl}-\text{C}_6\text{H}_4-\text{I}^+\text{AsF}_6^-]_2$ | 114 |
| $[(\text{CH}_3)_3\text{C}-\text{C}_6\text{H}_4-\text{I}^+\text{AsF}_6^-]_2$ | 174 |
| $[\text{O}_2\text{N}-\text{C}_6\text{H}_4-\text{I}^+\text{AsF}_6^-]_2$ | 102 |
| $[(\text{CH}_3)_3\text{C}-\text{C}_6\text{H}_4-\text{I}^+\text{SbF}_6^-]$ | 190 |
| $[(\text{CH}_3)_3\text{C}-\text{C}_6\text{H}_4-\text{I}^+\text{PF}_6^-]$ | 300 |

The above results show that the structure of the anion and the cation of the diaryliodonium salt had a significant effect on the epoxy resin cure time at ambient conditions.

EXAMPLE 3

The procedure of Example 1 was repeated, except that 1% by weight of ascorboyl palmitate in 0.3% by weight N-butanol, based on the weight of the resulting curable composition, was used in place of ascorbic acid. It was found that the resulting composition cured within 3-4 minutes without the use of external heat under atmospheric conditions.

EXAMPLE 4

There was added 0.1 part of copper benzoate and 0.2 part of ascorbic acid in combination with 0.6 part of acetone to a mixture with stirring consisting of 6 parts of 3,4-epoxycyclohexylmethyl-3',4'-epoxycyclohexane carboxylate and 0.2 part of diphenyliodonium hexafluoroarsenate. The mixture was stirred vigorously and then allowed to stand in a small container. After about 150 seconds, the mixture foamed and filled the container. There was obtained a rigid foam having a density of approximately 0.05 g/cc. The foam was suitable as a thermal insulator for a refrigerator.

The above procedure was repeated, except that Freon 11 was used in place of acetone. A foam was formed similar to the foam obtained using acetone.

EXAMPLE 5

A mixture of 6 parts of 3,4-epoxycyclohexylmethyl-3',4'-epoxycyclohexanecarboxylate and 3 parts of polycaprolactone, PCP0300, a product of the Union Carbide Corporation, was mixed with 0.2 part of diphenyliodonium hexafluoroarsenate, 0.1 part of copper benzoate, 0.2 part of ascorbic acid and 0.6 part of acetone. The mixture was vigorously stirred in a small glass container approximately ⅓ filled. In approximately 150 seconds the reaction mixture foamed and filled the container and then overflowed the container. The resulting foam was found to be flexible, based on the fact that it could be flexed at 180° without being permanently set. The density of the foam was approximately the same as in Example 4.

EXAMPLE 6

There was added to a 1.5% solution of diphenyliodonium hexafluoroaresenate in 2-chloroethylvinyl ether, 0.5% of copper benzoate and 0.5% of ascorbic acid. A vigorous reaction occurred within 3 minutes. The reaction mixture was then poured into methanol after standing an additional 15 minutes. There was obtained a 61.3% yield of polychloroethylvinyl ether after the resulting product was washed in methanol and dryed.

The above procedure was repeated, except that trimethyleneoxide was used in place of 2-chloroethylvinyl ether and the reaction was performed at 0° C. A 41.4% yield of polytrimethylene oxide was obtained.

EXAMPLE 7

There was added 0.3 part of copper benzoate and 0.3 part of ascorbic acid suspended in ethylene glycol to 9.4 parts of an acid reactive resole phenol formaldehyde based resin having allylic ether functional groups (Methylon 11 of the General Electric Company). The mixture was stirred thoroughly and poured into a shallow aluminum cup. After 30 minutes, the phenol formaldehyde resin was found to have cured to a hard rigid solid.

EXAMPLE 8

There were added 3 parts of stannous octoate and 3 parts of diphenyliodonium hexafluorophosphonate to 100 parts of 3,4-epoxycyclohexylmethyl-3',4'-epoxycyclohexane carboxylate (CY 179, ERL4221) and the resulting mixture was thoroughly stirred. There was then added to the mixture, 0.05 part of a 12% solution of copper naphthenate to the resulting mixture while it was rapidly stirred. The mixture hardened and became rigid at room temperature within two minutes.

The above procedure is repeated, except that the mixture prior to hardening is poured into a silicone mold. There is obtained a finished part within two minutes conforming to the shape of the mold.

EXAMPLE 9

Several 10 part aliquots were prepared from a mixture of 70 parts of the epoxy resin of Example 8 and 30 parts of a hydroxyl terminated polyester resin (Rucoflex F2018, Hooker Chemical Company). Various amounts of diphenyl iodonium hexafluorophosphate, copper naphthenate and stannous octoate were added to each of the 10 part aliquots. After each of the respective mixtures were thoroughly stirred they were allowed to stand at room temperature to determine how long it took for the mixture to gel. The results are shown in Table I which shows the parts of the various ingredients used in the mixture, and "Cu(Naphth)$_2$" is copper naphthenate, and "Sn(Oct)$_2$" is stannous octoate.

Table I

| $(C_6H_5)_2I^+PF_6^-$ | Cu(Naphth)$_2$ | Sn(Oct)$_2$ | Gel Time (min) |
|---|---|---|---|
| 3 | 0.15 | 3 | 7.5 |
| 3 | 0.30 | 3 | 5.0 |
| 3 | 0.45 | 3 | 3.5 |
| 3 | 0.60 | 3 | 3.2 |
| 3 | 0.60 | 6 | 2.5 |

The above results show improved epoxy resin cure rate with increasing copper and tin salt concentration.

EXAMPLE 10

There was added to a mixture of 70 parts of Epon 828, a diglycidyl ether of bisphenol-A, and 30 parts of of Rucoflex F2018 hydroxy terminated ester, which was divided into 10 part aliquots. Various parts of stannous octoate, copper naphthenate in mineral oil and various diphenyliodonium hexafluoroarsenate salts were used per each 10 part aliquot. The mixtures were stirred and allowed to stand at room temperature to determine cure time. The following results are shown in Table II, where "GT" is gel time, Cu$^{+2}$ is copper naphthenate and Sn$^{+2}$ is stannous octoate:

Table II

| Iodonium Salt (0.3 part) | Sn$^{+2}$ | Cu$^{+2}$ | GT (min) |
|---|---|---|---|
| $[(C_6H_5)_2I]^+ AsF_6^-$ | 0.6 | .072 | 3.4 |
| $[CH_3\text{-}C_6H_4\text{-}I\text{-}C_6H_4\text{-}CH_3]^+ AsF_6^-$ (di-tolyl) | 0.3 | .054 | 9 |
| $[(3,5\text{-}(CH_3)_2C_6H_3)_2I]^+ AsF_6^-$ | 0.3 | .054 | 9.75 |
| $[(Cl\text{-}C_6H_4)_2I]^+ AsF_6^-$ | 0.3 | .054 | 10 |

EXAMPLE 11

A mixture of 100 parts of ERL4221, which is the epoxy resin utilized in Example 8, 30 parts of acetone, 6 parts of a 50% solution of diphenyliodonium hexafluoroarsenate in propylene carbonate, 3 parts of stannous octoate and 0.5 part of a 12% solution of copper naphthenate, along with 0.1 part of Carbosil fume silica was vigorously stirred in a container. The resulting stirring mixture was then allowed to stand at room temperature. In approximately 4 minuts, a vigorous polymerization occurred along with the production of a voluminous low density foam which quickly became rigid. The above foam is useful as a thermal insulator.

EXAMPLE 12

There was added to 91 parts of the epoxy resin of Example 11, to 6 parts of a 50% solution of diphenyliodonium hexafluoroarsenate in propylene carbonate and 3 parts of stannous octoate. The resulting mixture was vigorously stirred and divided into 10 part aliquots to which various copper compounds were added respectively in 0.1 part amounts. The resulting mixtures were then stirred and allowed to rest under atmospheric conditions. Table III shows the gel time obtained in minutes which were obtained from each of the mixtures containing a particular copper compound:

Table III

| Copper Compound | Gel Time (min) |
|---|---|
| copper naphthenate | 0.8 |
| copper benzoate | 15.5 |
| copper salicylate | 12.4 |
| copper acetylacetonate | 16.4 |
| copper stearate | 47.5 |

The above results show that the effectiveness of copper compounds as redox catalysts can very widely.

EXAMPLE 13

A mixture was stirred consisting of 5 parts of epichlorohydrin, 0.25 part of diphenyliodonium hexafluoroarsenate, 0.2703 part of stannous octoate and 0.025 part of copper benzoate. Exothermic polymerization was immediately observed and after 5 minutes the mixture was poured into about 100 parts of methanol. There was obtained about 3 parts of polyepichlorohydrin rubber.

EXAMPLE 14

A mixture of 100 parts of ERL4221, the epoxy resin of Example 8, 3 parts of diphenyliodonium hexafluorophosphate, 3 parts of benzoin and 0.1 part of copper naphthenate as a 12% dispersion in mineral oil were thoroughly stirred together. The mixture was quickly poured into a silicone mold at 35° C. The mixture was found to harden within 5 minutes resulting in the production of a finished part which was removed from the mold.

EXAMPLE 14

A mixture of 5 parts of ε-caprolactone, 0.21 part of diphenyliodonium hexafluoroarsenate, 0.093 part of benzoin and 0.21 part of copper benzoate was placed in a sealed container. The sealed mixture was then heated at 50° C. for 30 minutes in a water bath and thereafter poured into 100 parts of methanol. A product precipitated which was filtered, washed with methanol and then dried. There was obtained 4.4 parts, or an 88% yield of polycaprolactone based on method of preparation.

EXAMPLE 15

The procedure of Example 14 was repeated, except that ε-caprolactone was replaced with 2-chloroethylvinyl ether. After the mixture was allowed to stand for 1 hour at room temperature, rapid exothermic polymerization occurred. There was obtained a low molecular weight poly-2-chloroethylvinyl ether, based on method of preparation.

EXAMPLE 16

There was added with stirring to a mixture of 70 parts of ERL4221 and 0.1 part of copper naphthenate as a 12% solution of mineral oil, 3 parts of benzoic and 3 parts of diphenyliodonium hexafluorophosphate dissolved in about 25 parts of acetone. The resulting mixture was thoroughly stirred and then allowed to rest under atmospheric conditions. Within 5 minutes, rapid polymerization occurred along with simultaneous vaporization of the acetone resulting the production of a low density closed cell rigid foam. It is found that the resulting foam is useful as a thermal insulator.

The above procedure was repeated except that addition to the above ingredients there was initially utilized in the mixture 30 parts of a hydroxy terminated polyester (Hooker Company Rocoflex R2018). There was obtained a flexible foam which was found to be suitable for furniture and automotive padding.

EXAMPLE 17

A solution of 91 parts of ERL-4221 epoxy resin, 3 parts of benzoin and 3 parts of diphenyliodonium hexafluoroarsenate was divided into 10 aliquots. There was then added to each 10 part aliquot at 40°–45° C., increments of copper naphthenate as a 12% solution in mineral oil. Each of the resulting mixtures was thoroughly stirred and gel times were noted. The following results were obtained, where the amounts of copper naphthenate are shown in parts:

Table IV

| Copper Naphthenate (parts) | Gel Time |
| --- | --- |
| 0.05 | 5 min, 35 sec |
| 0.15 | 5 min, 18 sec |
| 0.30 | 6 min, 5 sec |
| 0.45 | 6 min, 28 sec |
| 0.60 | 7 min, 21 sec |

The above results show that catalytic amounts of copper naphthenate achieve optimum gel times which increase as the concentration of the copper naphthenate increases.

EXAMPLE 18

A solution of 91 parts of ERL4221 epoxy resin, 3 parts of diphenyliodonium hexafluoroaresenate and 3 parts of propylene carbonate and 0.1 part of copper naphthenate as a 12% mineral oil solution was divided into 10 aliquots. Various benzoin compounds were then evaluated and 0.1 part levels utilizing the aforementioned 10 part aliquots. The following gel times were recorded at 25° C.

| Benzoin | Gel Time |
| --- | --- |
| (benzoin) | 22 min, 7 sec |
| (4,4'-dichlorobenzoin) | 75 min |
| (furoin) | 14 min, 40 sec |
| (4,4'-dimethoxybenzoin) | 43 min, 26 sec |
| (2-chloro-4',4''-dimethoxybenzoin) | 15 min, 8 sec |
| (4,4'-dimethylbenzoin) | 14 min, 50 sec |
| Stearoin | >60 min |

EXAMPLE 19

A mixture of 91 parts of the ERL4221 epoxy resin, 1 part of a copper naphthenate as a 12% solution in mineral oil and 3 parts of benzoin was divided into 10 part aliquots. Various diaryliodonium salts were then evaluated for effectiveness by utilizing them in the respective aliquots at a 0.3 part level. The following gel times were recorded:

| Diaryliodnium Salt | Gel Time |
| --- | --- |
| $(C_6H_5)_2 I^+ AsF_6^-$ | 5 min, 44 sec |
| $(p\text{-}CH_3\text{—}C_6H_4)_2I^+ AsF_6^-$ | 7 min, 53 sec |
| $(p\text{-}t\text{-}but\text{-}C_6H_4)_2I^+ AsF_6$ | 6 min, 27 sec |
| $(p\text{-}Cl\text{—}C_6H_4)_2I^+ AsF_6^-$ | 8 min, 17 sec |
| $(p\text{-}CH_3\text{—}C_6H_4)_2I^+ SbF_6$ | 5 min, 1 sec |
| $(p\text{-}CH_3\text{—}C_6H_4)_2I^+ PF_6^-$ | 5 min, 26 sec |

Although the above examples are directed to only a few of the very many variables which can be employed in the practice of the method of the present invention, as well as to the wide variety of curable compositions resulting therefrom, it should be understood that a much broader variety of cationically polymerizable materials can be utilized in combination with diaryliodonium salts, copper salts and ascorbic acid derivatives as set forth in the description preceding these examples.

What I claim as new and desired to secure by Letters Patent of the United States is:

1. A foaming method which comprises
(1) agitating a curable composition comprising,
   (E) a cationically polymerizable organic material,
   (F) 1% to 35% by weight of the curable composition of a mixture of
      (vii) a diaryliodonium salt of the formula, $$[(R)_a(R^1)_bI]^+[Y]^-,$$

(viii) 0.5 part to 10 parts, per part of (vii), of a member selected from the class consisting of ascorbic acid, an ascorbic acid derivative, an Sn$^{+2}$ salt and an activated α-hydroxy compound, and (G) 1% to 30% by weight of (E), (F), & (G) of a volatile inert organic solvent and (2) allowing the ingredients of the resulting mixture to react resinting in the production of exothermic heat and the simultaneous vaporization of the organic solvent and the cure of the cationically curable organic resin, where R is a monovalent aromatic organic radical, R$^1$ is a divalent aromatic organic radical, Y is a non-nucleophilic anion, a is a whole number equal to 0 or 2, and b is a whole number equal to 0 or 1.

2. A method in accordance with claim 1, where the cationically polymerizable organic resin is an epoxy resin.

3. A method in accordance with claim 1, where the cationically polymerizable organic resin is a mixture of an epoxy resin and a hydroxy terminated polyester.

* * * * *